United States Patent
Meyer et al.

(10) Patent No.: US 10,876,846 B1
(45) Date of Patent: Dec. 29, 2020

(54) REROUTING IN A NAVIGATION SYSTEM BASED ON UPDATED INFORMATION

(71) Applicant: Google LLC, Mountain View, CA (US)

(72) Inventors: Cayden Meyer, Sydney (AU); Scott James Ogden, Chippendale (AU)

(73) Assignee: Google LLC, Mountain View, CA (US)

(*) Notice: Subject to any disclaimer, the term of this patent is extended or adjusted under 35 U.S.C. 154(b) by 13 days.

(21) Appl. No.: 16/009,320

(22) Filed: Jun. 15, 2018

Related U.S. Application Data

(63) Continuation of application No. 15/251,071, filed on Aug. 30, 2016, now Pat. No. 10,024,669.

(51) Int. Cl.
*G01C 21/34* (2006.01)
*G01C 21/36* (2006.01)

(52) U.S. Cl.
CPC ..... *G01C 21/3415* (2013.01); *G01C 21/3438* (2013.01); *G01C 21/3614* (2013.01); *G01C 21/3673* (2013.01); *G01C 21/3676* (2013.01); *G01C 21/3682* (2013.01)

(58) Field of Classification Search
CPC ............ G01C 21/3415; G01C 21/3438; G01C 21/3682; G01C 21/3614; G01C 21/3673; G01C 21/3676
See application file for complete search history.

(56) References Cited

U.S. PATENT DOCUMENTS

| | | |
|---|---|---|
| 7,020,623 B1 | 3/2006 | Tiley et al. |
| 7,020,625 B2 | 3/2006 | Tiley et al. |
| 7,080,018 B1 | 7/2006 | Fox et al. |
| 7,577,244 B2 | 8/2009 | Taschereau |
| 8,533,761 B1 | 9/2013 | Sahami et al. |
| 9,857,188 B1* | 1/2018 | O'Hare .............. G01C 21/3626 |
| 2008/0154696 A1 | 6/2008 | Spiegelman et al. |
| 2008/0214157 A1 | 9/2008 | Ramer et al. |
| 2010/0088179 A1 | 4/2010 | Desai et al. |
| 2010/0262456 A1 | 10/2010 | Feng et al. |
| 2014/0074395 A1* | 3/2014 | Brown ............... G01C 21/3682 |
| | | 701/424 |
| 2017/0108348 A1 | 4/2017 | Hansen et al. |
| 2017/0132934 A1 | 5/2017 | Kentley et al. |

* cited by examiner

*Primary Examiner* — Kimberly S Berona
*Assistant Examiner* — Michael V Kerrigan
(74) *Attorney, Agent, or Firm* — Fish & Richardson P.C.

(57) ABSTRACT

A navigation system can identify locations of interest at a route destination. Those locations of interest at the destination can fall within a predetermined distance of the destination or those that are responsive to a query that includes the destination as a parameter. The navigation system can receive a selection of an identified location of interest near the destination, and update a route to terminate at the identified location of interest rather than the original destination. Information identifying the origin and destination for the route can be collected at a first user device and the route can be displayed at a second user device. Additional information is then received from the first user device (such as a selection of an identified location of interest near the destination). This additional information received at the first user device is used to update the route that is displayed on the second user device.

20 Claims, 8 Drawing Sheets

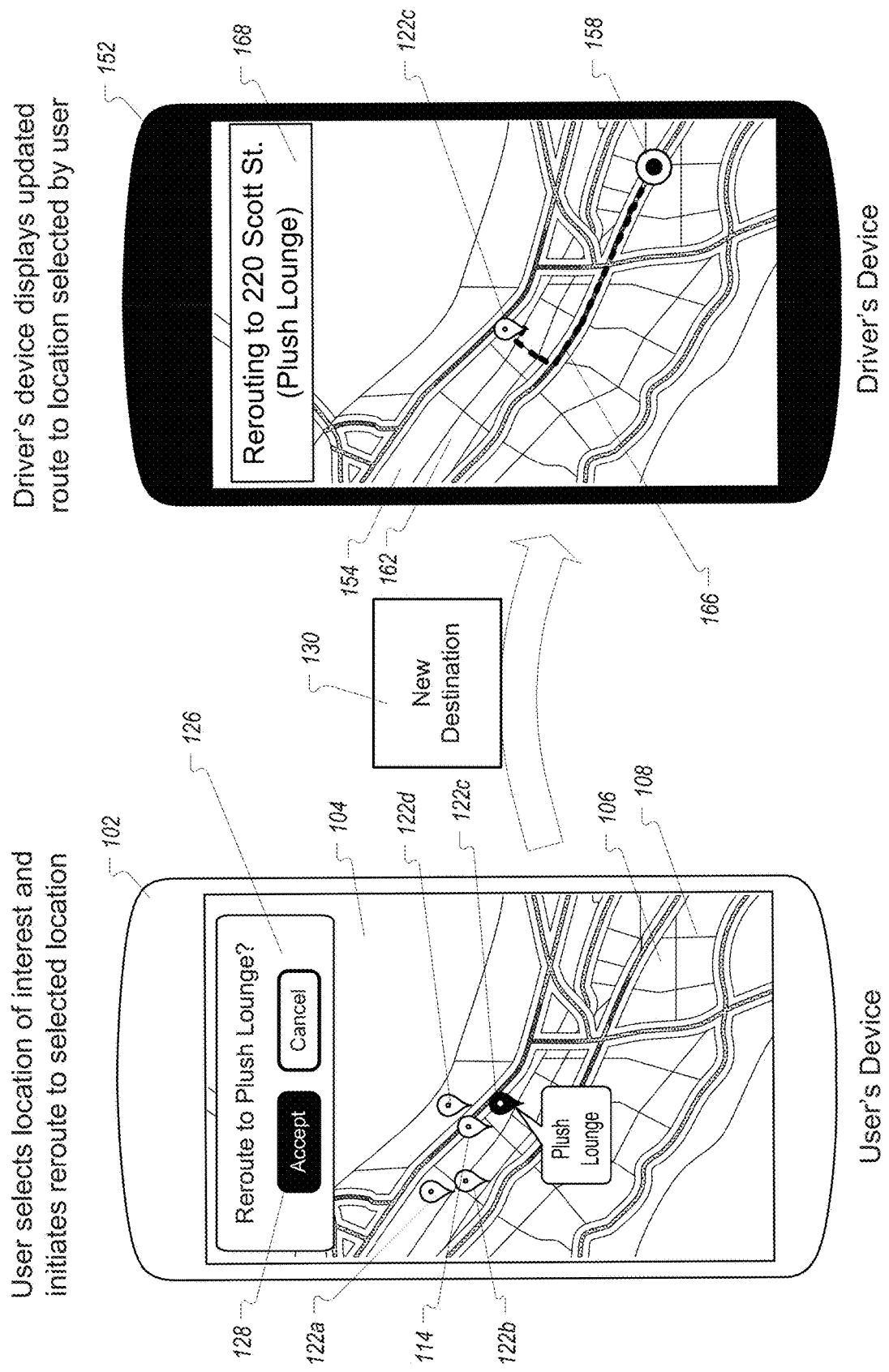

US 10,876,846 B1

REROUTING IN A NAVIGATION SYSTEM BASED ON UPDATED INFORMATION

CROSS-REFERENCE TO RELATED APPLICATIONS

This application is a continuation of and claims priority to U.S. application Ser. No. 15/251,071, filed on Aug. 30, 2016, the entire contents of which are hereby incorporated by reference.

TECHNICAL FIELD

This document generally relates to rerouting in navigation systems based on updates to routing-related information.

BACKGROUND

Personal navigation systems provide routing information between various geographic points. Routing information can include, for example, turn-by-turn directions, a display of one or more routes over a digital map, or public transit instructions. Routes can be provided between a user's current location and a desired destination, or between a user-identified origin and a desired destination. Personal navigation systems can use information received from various outside sources (such as position-identification information, destination-address information, and map-database information) when determining routes between geographic points.

SUMMARY

This document describes techniques, methods, systems, and other mechanisms for updating routes provided by a navigation system based on updated information. The techniques, methods, systems, and other mechanisms described herein include processes for determining a route between an origin and a destination, identifying locations of interest at the destination, wherein those locations of interest at the destination may be those that fall within a predetermined distance of the destination or those that are responsive to a query that includes the destination as a parameter, receiving a selection of an identified location of interest near the destination, and updating the route to terminate at the identified location of interest rather than the original destination. In some implementations, information identifying the origin and destination for the route is collected at a first user device and the route is displayed at a second user device. Additional information is then received from the first user device (such as, for example, a selection of an identified location of interest near the destination). This additional information received at the first user device is used to update the route that is displayed on the second user device.

For example, a user can search for a particular geographic location using a mapping application, a web browser, or another application that facilitates searching for physical locations running on a computing device, such as a mobile phone. The user can, for example, enter the name of a particular music venue or a type of restaurant into a search bar of a mapping application. The mapping application can provide the user with information on the particular geographic location (such as, for example, address or hours of operation) and also can provide one or more options for traveling to the particular geographic location (such as, for example, driving directions, public transit directions, rideshare options, and taxi service options). The user can elect to use one or more rideshare or taxi services to request a ride from an origin to the particular geographic location.

The origin or "pickup" location for the ride can be determined based on information collected by the user's computing device, such as a location determination system of the computing device (e.g., GPS equipment) or user input collected by the computing device (e.g., such as the rider dropping a pin at a location on the map or entering an address). A driver (such as a rideshare driver or taxi driver) can receive information on another computing device that indicates the origin or "pickup" location and the desired destination (the particular geographic location identified by the user) as well as other information, such as a route from the driver's current location to the pickup location and a route from the pickup location to the destination. For example, a remote server can receive the pickup location and destination information from the user's device and provide the information (as well as additional information, in some cases) to the driver's computing device.

Additionally, the same remote server, or another remote server can provide information to the user's computing device regarding indication locations of interest near the destination. For example, if the destination is a restaurant, the same or another remote server can provide, to the user's computing device, information identifying bars and restaurants near the destination. The user's computing device can display the information to the user. For example, the user's computing device can display locations of the locations of interest over a map display. The user can select various identified locations of interest to review additional information on the identified locations of interest. The user can also select a particular location of interest to cause the route displayed to the driver on the driver's computing device to be recalculated. For example, the user can select a particular location of interest on the user's computing device, an indication of this selection can be sent to the remote server, and the remote server can cause the driver's computing device to display an updated route that terminates at the particular location of interest rather than the original destination for the ride. Other factors relating to the car share or taxi ride can also be automatically adjusted based on the new destination identified by the user's computing device.

In general, one innovative aspect of the subject matter described in this specification can be embodied in a computing device having a memory storing data and instructions and one or more processors that execute instructions stored on the memory. The instructions can cause the one or more processors to execute instructions that perform actions including receiving, at a computing system and from a first mobile computing device, first location information indicating a first location; receiving, at the computing system and from the first mobile computing device, second location information indicating a desired destination that user input at the first mobile computing device selected; transmitting, by the computing system and to a second mobile computing device, transportation information indicating the first location and the desired destination; identifying, by the computing system, one or more locations of interest within a determined geographic proximity of a location selected based on a route from the first location to the desired destination; transmitting, by the computing system to the first mobile computing device, information identifying the one or more locations of interest for presentation by the first mobile computing device, wherein the information identifying the one or more locations of interest includes a location for each of the one or more locations of interest; receiving, by the computing system and from the first mobile computing device, an indication of a user selection of a particular one of the one or more locations of interest; transmitting, by the computing system, to the second mobile computing device, and prior to the second mobile computing device reaching the desired destination, rerouting instructions to cause the second mobile computing device to present an updated route to the selected location of interest for display by the second mobile computing device.

These and other embodiments can each optionally include one or more of the following features. Identifying the one or more locations of interest can be performed by the computing system without the computing system receiving an explicit request from the first mobile computing device to identify the one or more locations of interest. The first location information indicating the first location of the first mobile computing device and the second location information indicating the desired destination can be received by the computing system as part of a ride-share request generated by a ride-share application executing on the first mobile computing device. The computing system can transmit the transportation information to the second mobile computing device as part of a rideshare request. The computing system can transmit the transportation information to the second mobile computing device for presentation by a rideshare application executing on the second mobile computing device. The actions can further include determining, by the computing system, that the first mobile computing device has progressed to a particular point along the route from the first location to the desired destination. The computing system can transmit the information identifying the one or more locations of interest for presentation by the first computing device as a result of having determined that the first mobile computing device has progressed to the particular point. The determined geographic proximity can be determined at least in part based on the determination that the first mobile computing device has progressed to the particular point along the route from the first location to the desired destination.

The actions can further include determining, by the computing system, a distance from the first mobile computing device to the desired destination. The determined geographic proximity can be determined at least in part based on distance from the first mobile computing device to the desired destination. The first location information can include a location that was received as user input at the first mobile computing device. The first location information can include a location of the first mobile computing device. The actions can further include receiving, (i) by the computing system, (ii) from the second mobile computing device, and (iii) prior to identifying one or more locations of interest within a determined geographic proximity of a location selected based on a route from the first location to the desired destination, an indication that the second mobile computing device has begun to travel from the first location to the desired destination. Transmitting information identifying the one or more locations of interest for presentation by the first mobile computing device can be performed in response to receiving the indication that the second mobile computing device has begun to travel from the first location to the desired destination.

Particular implementations can, in certain instances, realize one or more of the following advantages. Routing information presented on a mobile computing device can be updated in real time based on information received from various other computing devices. A navigation system can provide suggested alternative destination options to a user to allow the user to more readily identify a destination for a particular trip. The timing of information presentation is determined such that information can be quickly and readily assessed by users at times when the information is most useful. Communications network resources and memory storage resources are conserved by only presenting limited amounts of relevant information at specific times based on navigation-related information collected from various computing devices.

The details of one or more implementations are set forth in the accompanying drawings and the description below. Other features, objects, and advantages will be apparent from the description and drawings, and from the claims.

DESCRIPTION OF DRAWINGS

FIGS. 1A-1F are conceptual diagrams of user interfaces presented on computing devices in a navigation system, and on information flow between the computing devices in the navigation system.

Like reference symbols in the various drawings indicate like elements.

DETAILED DESCRIPTION

Figures 1A, 1B:
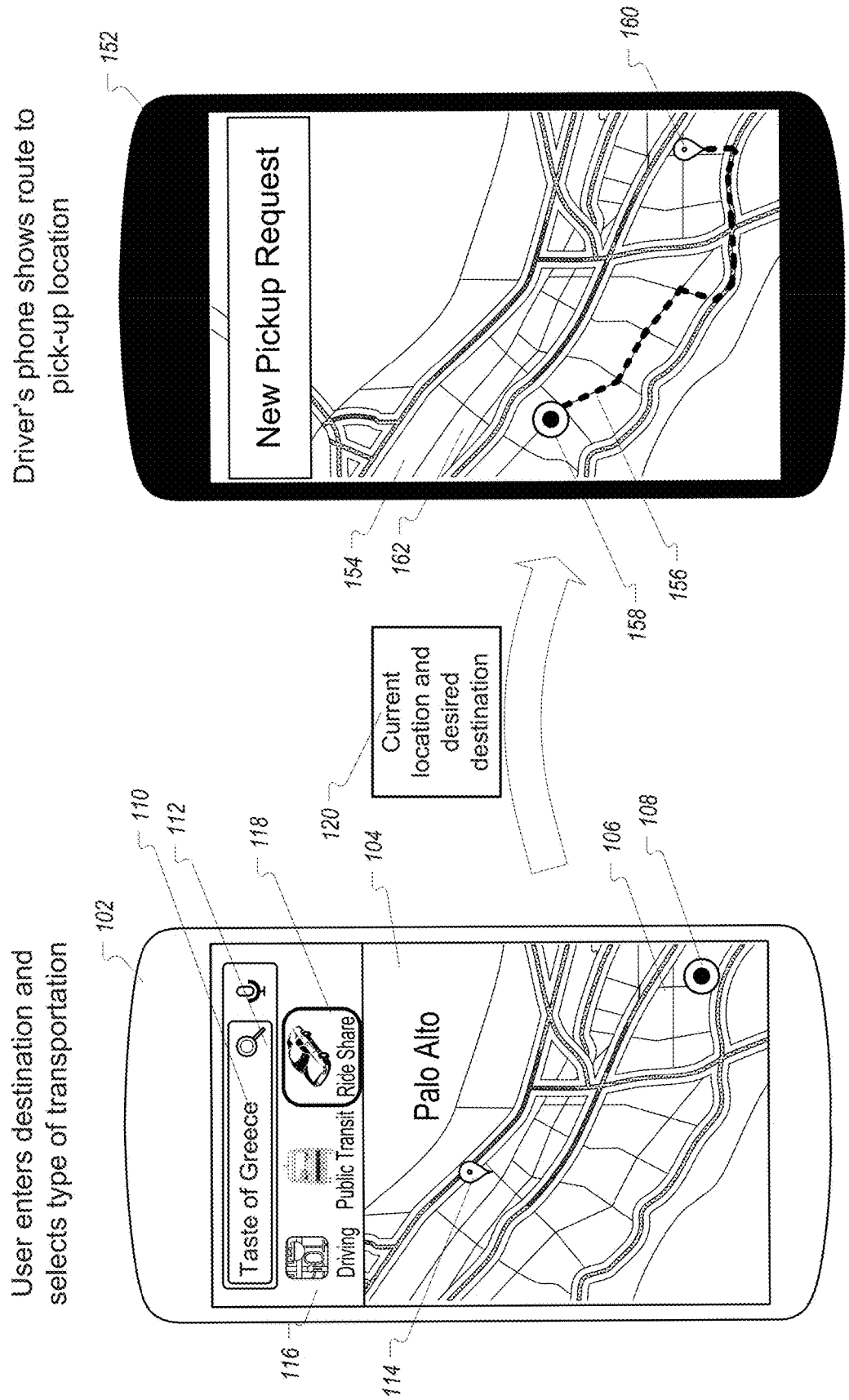

This document generally describes a navigation system that updates travel routes as new information is received and presents options for updating trip information based on a current state of a trip (e.g., how far a trips has progressed). For example, after a rideshare trip has commenced, a user device can prompt a user to enter additional information or change a parameter of the trip (such as alter the destination). The user device can prompt the user to enter additional information for the trip by, for example, displaying suggestions for alternate destinations (e.g., locations of interest) that a user may want to set as a new destination for the trip. The user can select one of the displayed suggestions to view additional information about the suggested location of interest and/or alter the rideshare trip. This additional or updated information can be used to update a route displayed on a computing device of a driver providing transportation for the rideshare service. In some implementations, presentation of the information is triggered, in part, based on information received from the driver's computing device.

As another example, a user engaged in a trip that involves public transportation can be provided with suggestions for alternate destinations or locations of interests along a route to an originally-identified destination, with presentation of the suggestions being triggered by information collected from the user's computing device or another computing device indicating a stage of the trip. For example, information collected from the user's computing device can indicate that the user is currently walking toward a bus stop to take a bus to a desired location. This indication that the user is walking toward the bus stop can trigger presentation of a first set of suggestions on the user's computing device. Later, information collected from the user's computing device and/or another computing device (such a computing device that tracks bus locations) can be used to determine that the user has entered a second stage of the trip that involves riding the bus. This determination can trigger presentation of a second set of suggestions on the user's computing device.

Turning to the example depicted in FIGS. 1A-1F, various graphic user interface displays on a user's mobile computing device 102 and a driver's mobile computing device 152 are shown. The user's device 102 can be a mobile phone as shown in the example in FIG. 1A. In other implementations, the user's device 102 can be a personal digital assistant, a tablet, a smart watch, a laptop computer, a net book, a desktop computer, a camera, or another type of electronic computing device. The user's device 102 includes a display 104 for displaying information to a user. In some implementations, the display 104 can be a touchscreen for receiving user input. In some implementations, the user's device 102 can include one or more keys (such as, for example, a keyboard) or actionable buttons for receiving user input. The user's device 102 can also include one or more location detection modules for receiving location information and processing the received location information to determine a location of the user's device 102. For example, the user's device 102 can include a GPS unit, a dead reckoning location determination unit, or a location determination module that relies on radio signal triangulation (e.g., based on signals received from cellular communication towers).

Similarly, the driver's device 152 can be a mobile phone as shown in the example in FIG. 1B. In other implementations, the driver's device 152 can be a personal digital assistant, an in-car computing device, a tablet, a smart watch, a laptop computer, a net book, a desktop computer, a camera, or another type of electronic computing device. For example, the driver's device 152 can be a computing device installed in the driver's vehicle that displays information on a dashboard display and receives input through one or more input mechanisms installed in the vehicle. The driver's device 152 includes a display 154 for displaying information to the driver. The display 154 can be, for example, installed in the dashboard of the driver's vehicle. In some implementations, the display 154 can be a touchscreen for receiving user input. In some implementations, the driver's device 152 can include one or more keys (such as, for example, a keyboard) or actionable buttons for receiving input. The driver's device 152 can also include one or more location-detection modules for receiving location information and processing the received location information to determine a location of the driver's device 152.

Returning to FIG. 1A, in the example shown, the user's device 102 is executing a mapping application that causes the user's device 102 to provide a map display 106 on the display 104. The map display 106 shows various roads, bodies of water, and other geographic features in an area around the location of the user's device 102. A location indicator 108 shows the location of the user's device 102 on the map display 106 relative to other geographic features depicted by the map display 106. The location of the user's device 102 can be determined, for example, using GPS equipment included in the user's device 102.

In the example shown in FIG. 1A, the user has entered a search query 110 into a map search query field 112. In this example, the search query 110 is for a restaurant called "Taste of Greece." The user can enter the search query 110, for example, using touch screen functionality of the display 104 to select keys of a keyboard (not shown) displayed on the display 104 to enter the search query 110. As another example, the user can use physical keys incorporated as part of the user's device 102 or in operative communication with the user's device 102 to enter the search query 110.

In some implementations, results for the entered search query 110 are stored in a cache in memory of the user's device 102. The user's device 102 can access the cache to identify one or more results for the search query 110. In other implementations, the user's device 102 resolves the query by contacting a remote server (e.g., by connecting to a wireless communication network as explained in more detail with respect to FIG. 2). The remote server can provide results for the search query. The mapping application running on the user's device 102 can display one or more of the search results for the search query 110 on the map display 106. In the example shown, the mapping application shows a location icon 114 on the map display 106 to show a location of a business that matches the search query 110. In this example, the location icon 114 shows the location of Taste of Greece.

The map display 106 provides the user with a menu of routing options 116 for traveling to the location indicated by the location icon 114. The routing options can include, for example, driving directions, public transit directions, a rideshare service, walking directions, biking directions, or other forms of directions that involve one or more modes of transportation. In the example shown in FIG. 1A, the user has selected a rideshare icon 118 presented by the map display 106. In some implementations, selection of the rideshare icon 118 can cause the user's device 102 to execute a rideshare application, open up a rideshare webpage in a browser executing on the user's device 102, or provide additional rideshare options in the map display 106. The user's device 102 can display various rideshare options that can be selected by the user (e.g., type of car, particular rideshare service, type of rideshare service, or rideshare trip options). For example, the user's device 102 can allow the user to indicate if the current location of the user's device 102 (e.g., as indicated by the location indicator 108) should be used as a pickup location for a rideshare trip, or allow the user to enter another location as the pickup location for the rideshare trip. In some implementations, the user can also set the destination and pickup location in a rideshare application that interfaces with the systems described throughout this document to obtain map and location of interest information.

Upon collecting various rideshare trip parameters from the user, the user's device 102 can transmit a rideshare request to a remote computing system (such as a rideshare server system (not shown)) which can in turn transmit pickup requests to user devices of one or more drivers associated with the rideshare service. For example, the current location and desired destination information 120 received by the user's device 102 is provided from the user's device 102 to the driver's device 152 by way of the remote computing system. A driver (such as the driver associated with the driver's device 152) can respond to the pickup request to initiate the rideshare trip.

Upon acceptance of the pickup request by the driver (or alternatively, upon receipt of the current location and desired destination information 120) the driver's device 152 displays a route 156 from the current location 158 of the driver's device 152 to the pickup location 160 indicated by the user of the user's device 102 (in this example, the pickup location 160 is the current location of the user's device 102). The route 156 is displayed over a map display 162 on the display screen 154 of the driver's device 152. In some implementations, the driver's device 152 can provide other navigation information to the driver, such as turn-by-turn directions displayed on the display screen 154 or audible voice directions. The driver's device 152 can track the progress of the driver as she follows the route 156 to the pickup location 160.

Figure 1D:
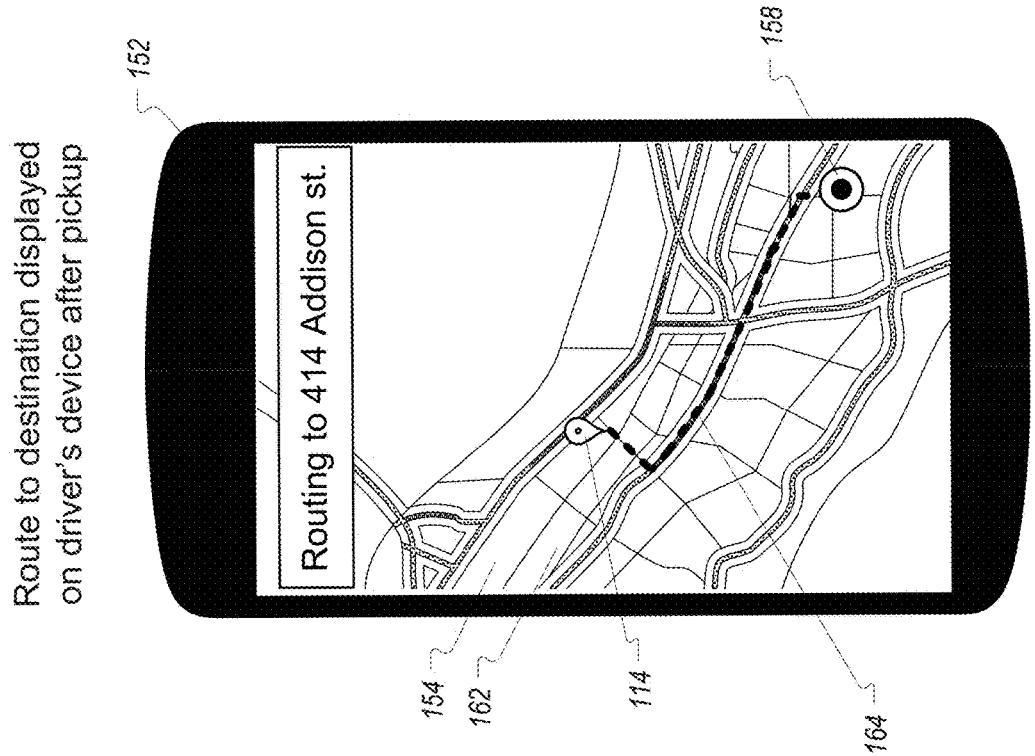
Figure 1C:
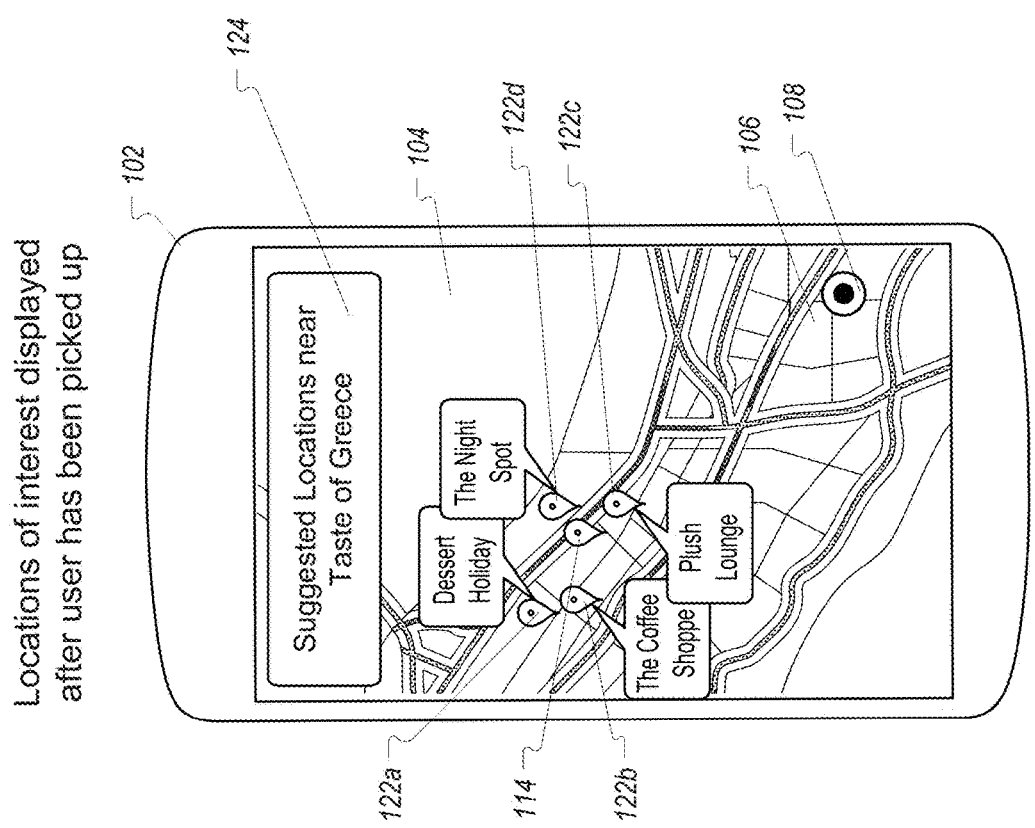

Turning to FIG. 1C, the map display 106 can present new information to the user. In some implementations, presentation of additional information is triggered by a determination that the trip has entered a particular stage, or that some other parameter associated with the trip has been satisfied. For example, a remote computing system can use information received from the user's device 102 and/or the driver's device 152 to determine that the user has been picked up by the driver. For example, location information received from the user's device 102 can be compared to location information received from the driver's device 152 to determine that the user's device 102 and the driver's device 152 are in the same relative location. This determination can indicate that the user has been picked up by the driver. As another example, the driver can use one or more input devices of the user's device 102 (such as touch screen functionality) to enter information indicating that the driver has picked up the user. As yet another example, location information received from the user's device 102 can be analyzed to determine that the user's device 102 is traveling along a route to the desired destination at a rate of speed that indicates that the user is traveling in a car. This determination can indicate that the driver has picked up the user.

In response to determining that the trip has progressed to a predetermined stage (e.g., the user has been picked up) the user's device 102 displays a number of locations of interest 122a-d. The user's device 102 can also display a notification 124 indicating that the additional points displayed on the map display 106 are suggested locations of interest. In the example shown in FIG. 1C, the locations of interest 122a-d are displayed as part of the map display 106 as icons showing the positions of the locations of interest 122a-d on the map. In some implementations, the suggested locations of interest 122a-d can be displayed in other manners, such as pop-up icons or badges displayed over the map display 106 that are not positioned with respect to the map display 106 according to physical geographic locations associated with the locations of interest 122a-d. For example, one or more notification boxes, such as the notification 124, can include information on one or more suggested locations of interest.

The locations of interest 122a-d can be identified based on one or more parameters identified based on aspects of the trip, information about the user, information about the originally identified desired destination, or other relevant information. As a first example, the locations of interest 122a-d can be identified based on parameters associated with a route from the pickup location 108 to the desired destination 114. For example, a remote server can search for locations (such as restaurants, coffee shops, night clubs, or other businesses that may be of interest to the user) within a set geographic proximity of the desired destination 114. As another example, the remote server can search for locations of interest within a set geographic proximity of any portion of a route from the pickup location 108 to the desired destination 114. For example, the remote server can identify locations of interest that are geographically located within half a mile of any portion of the fastest driving route from the pickup location 108 to the desired destination 114.

In some implementations, the geographic range in which locations of interest are identified is modified as the user progresses through different stages of the trip and/or as the user's device 102 changes geographic location. For example, the user's device 102 can display a first set of suggested locations of interest to the user prior to the user being picked up by the driver. The first set of suggested locations of interest can be, for example, locations within a first geographic proximity of the desired destination 114. Upon the user being picked up by the driver, the user's device 102 displays a second set of suggested locations of interest (such as the locations of interest 122a-d shown in FIG. 1C) that are within a second geographic proximity of the desired destination 114, which may have a different area or shape (e.g., the second geographic proximity may be smaller). As the user travels along the route to the desired destination 114 (i.e., in the car of the driver) the user's device 102 displays a third set of suggested locations of interest at some point along the route. The third set of suggested locations of interest can be within a third, even smaller geographic proximity of the desired destination 114. The display of the third set of locations of interest can be displayed, for example, after the user has traversed a certain portion of the route to the desired destination 114. Continuing with this example, the user's device 102 displays a fourth set of suggested locations of interest that are within a proximity of the desired destination 114 that is smaller than all of the proximities used for identifying the first through third sets of suggested locations of interest.

In a separate example, a first set of suggested locations of interest presented to the user prior to the user being picked up can be locations that are within a particular geographic proximity of the pickup location 108, while a second set of suggested locations of interest presented to the user after the user has been picked up can be locations that are within a particular geographic proximity of the desired destination 114 or of the route to the desired destination 114, and a third set of suggested locations of interest presented to the user after the user has been dropped off can be locations that are within a different particular geographic proximity of the desired destination 114. The geographic proximity can be absolute distance, driving distance, or driving time, among a few examples.

Presenting different sets of suggested locations of interest based on different geographic parameters along different portions of the trip can achieve the benefit of presenting suggested locations of interest to the user that may be most relevant to the user at different particular points in time along the trip. For example, the user may be interested in traveling to an alternative destination that is located in any direction from the user's original location (e.g., the pickup location) prior to being picked up. However, the user may only be interested in locations that are along the route to the original desired destination 114, or that are near the desired destination 114 once the user has been picked up and begun to travel toward the desired destination 114. Additionally, the user may only be interested in suggested locations of interest that are within walking distance of the desired destination 114 after the user has been dropped off at or near the desired destination 114.

In some implementations, rather than (or in addition to) displaying different information to the user based on the stage of the trip, the same information can be displayed in a different manner based on the stage of the trip. For example, prior the user being picked up, the suggested locations of interest can be displayed on a bottom third of the display screen 104. Then, after the user has been picked up, the display of the suggested locations of interest can be expanded to take up two thirds of the screen. As another example, the suggested locations of interest can be displayed as locations on the map display 106 while the user is traveling in the driver's vehicle, and the display can switch to display the suggested locations of interest (or different suggested locations of interest) in notification boxes unrelated to a location on a map display after the user has been dropped off by the driver.

As a second example of parameters that can be used to identify the locations of interest 122a-d, a remote serving system can access information on user preferences to determine types of locations that may be of interest to the user. For example, user profile information provided by the user or past historical activity information for the user can indicate that the user enjoys outdoor recreation and natural settings. The remote serving system can identify parks, lakes, woods, hiking trails, and other natural or outdoor locations as suggested locations of interest to present to the user on the user's device 102 based on this identified user preference. As another example user profile information provided by the user or past historical activity information for the user can indicate that the user enjoys music. Based on this identified user preference, the remote serving system can identify music stores, music venues, or music themed restaurants as suggested locations of interest.

As a third example of parameters that can be used to identify the locations of interest 122a-d, a remote serving system can identify aspects of the originally identified desired destination 114 and use these aspects of the desired destination 114 to determine suggested locations of interest. For example, if the desired destination 114 is a particular business establishment, the remote serving system can identify locations of interest that can act as substitutes for the desired destination 114. For example, if the desired destination 114 is a fried chicken restaurant. The remote serving system can identify one or more other fried chicken restaurants as suggested locations of interest. As another example, the remote serving system can identify locations of interest that correlate with or compliment an aspect of the desired destination 114. For example, if the desired destination 114 destination is a movie theater, the remote serving system can identify bars and restaurants near the move theater as suggested locations of interest because a person attending a movie may also want to eat dinner or have a drink before or after the movie.

In some implementations, the computing system that includes the user's device 102 can use anonymized information gathered from other user devices in identifying the locations of interest 122a-d. For example, the computing system can observe user activity of users of other computing devices to determine that users who travel to the desired destination 114 (i.e., "Taste of Greece") at a particular time of day (e.g., mid-evening) tend to regularly visit other particular nearby establishments. For example, in the example shown in FIG. 1C, the computing system can identify "Dessert Holiday" (122a), "The Coffee Shoppe" (122b), "Plush Lounge" (122c), and "The Night Spot" (122d), as locations that persons who travel to the desired destination 114 generally also visit during the same outing. This observed historical activity for other users is used to select the locations of interest 122a-d for presentation on the user's device 102.

In some implementations, rather than using historical activity of users who traveled to the specific desired destination 114, the system can identify popular destinations for persons who have traveled to the general geographic area that includes the desired destination 114. For example, the desired destination 114 may be located in a nightlife district that features a number of restaurants, night clubs, and other night time activity establishments. The computing system that includes the user's device 102 can identify popular destinations for persons who have traveled to the area around the desired destination 114 based on historic user activity and select some or all of the identified popular destinations as the locations of interest 122a-d.

As a fourth example of parameters that can be used to identify the locations of interest 122a-d, a remote serving system can identify temporal factors for use in identifying the locations of interest 122a-d. For example, if the time of day is currently morning, the remote serving system can use this information to identify breakfast restaurants as locations of interest. As another example, if the time of day is early evening, the remote serving system can identify cocktail lounges and bars as potential locations of interest. As yet another example, the server system can compare the current time of day to hours of operation information for particular locations to identify locations of interest that are currently open for business or otherwise open for operation.

As a fifth example, weather forecasts could also be used in identifying suggested locations of interest. For example, if the desired destination is an outdoor venue and the remote serving system identifies that the weather forecast calls for rain, the remote serving system can identify indoor venues that are similar to the desired destination for presentation as suggested locations of interest. In such a case, presentation of the suggested locations of interest on the user's device 102 can include an indication of the weather report and a suggestion that the user consider other similar venues to the desired destination that are indoors to avoid the rain.

In some implementations, combinations of the above factors are used to identify the locations of interest 122a-d. For example, the computing system that includes the user's device 102 can use a combination of information on user preferences of the user of the user's device 102, information on activities of other users, and parameters associated with one or more routes to the desired destination 114. For example, the computing system that includes the user's device 102 can access user preference information to determine that the user enjoys video games. The computing system can then identify a geographic region having a particular proximity to the desired destination 114, and the use information on historic activity of other users to identify popular video game related establishments in the identified geographic region near the desired destination 114.

Turning to FIG. 1D, after the driver has picked up the user, the map display 162 on the driver's device 152 updates to show a route 164 from the driver's current location 158 to the desired destination 114. The route 164, for example, can be calculated at the driver's device 152, or at a remote navigation computing system. In some implementations, the driver's device 152 can provide other navigation information to the driver, such as turn-by-turn directions displayed on the display screen 154 or audible voice directions. The driver's device 152 can track the progress of the driver as she follows the route 164 to the desired destination 114. As the driver progresses along the route 164, the driver's current position 158 can be updated on the map display 162. In some implementations, as the driver's device 152 moves along the route 164, information from the driver's device 152 is provided to the user's device 102 indicating progress along the route 164. For example, the driver's device 152 can communicate to the user's device 102 (e.g., through a rideshare server) the route being taken by the driver (i.e., the route 164). As the driver progresses along the route 164, this can trigger the user's device 102 to update information presented on the display screen 104 (e.g., update the displayed suggested locations of interest 122a-d).

Turning to FIG. 1E, as described above, the user can select one or more of the locations of interest 122a-d to cause the user's device 102 to display additional information (not shown) on the selected location of interest. For example, the user's device 102 can display information on hours of operation, pictures of the location (e.g., retrieved from a street view service or posted on the business's social media page), a brief description, user reviews (e.g., obtained from a user review website), and other relevant information such as menus, activities, features, or specials. The map display 106 can also allow the user to select one of the locations of interest 122a-d as a new destination for the trip that is currently in progress.

In the example displayed, the user has selected suggested location of interest 122c ("Plush Lounge") as a new destination for the current trip. In this example, this causes the user's device 102 to display a prompt 126 requesting that the user verify the selection of location of interest 122c as the new destination for the current trip. The user selects a button 128 on the touch screen of the user's device 102 to confirm selection of the location of interest 122c as the new destination for the current trip.

Information indicating the new destination 130 selected by the user at the user's device 102 is transmitted from the user's device 102 for delivery to the driver's device 152. For example, the user's device 102 can communicate with the rideshare computing system through a communications network. The rideshare computing system can then provide the updated destination information 130 to the driver's device 152.

Continuing with the example shown in FIG. 1F, the driver's device 152 receives the new destination information 130 and calculates an updated route 166 to the new destination/location of interest 122c. The updated route 166 is calculated from the driver's current location 158 to the location of interest 122c selected by the user at the user's device 102. In some implementations, the calculation of the new route is performed at a remote computing system and provided to the driver's device 152 for display to the driver. The updated route 166 is presented on the driver's device 152 while the driver is traversing the original route 164. The updated route 166 allows the driver to adjust the trip and transport the user to the newly selected destination. In addition to the updated route 166, the driver's device 152 displays a notification 168 indicating that the user has elected to reroute the trip to the new destination. In the example shown, the notification 168 indicates the address for the new destination and the name of the establishment at the new destination. The driver's device 152 can track the driver's progress along the updated route 166 and update the map display 162 accordingly to show the driver's progress along the updated route 166.

In some implementations, the display presented on the user's device 102 is updated upon the user being dropped off at or arriving at the new destination 122c. In some implementations, a remote computing system can use information received from the user's device 102 and/or the driver's device 152 to determine that the user has been dropped off at or has arrived at the new destination 122c. For example, location information received from the user's device 102 can be compared to location information received from the driver's device 152 to determine that the user's device 102 and the driver's device 152 are no longer in the same relative location. This determination can indicate that the user is no longer in the driver's vehicle and has therefore been dropped off by the driver. As another example, the driver can use one or more input devices of the user's device 102 (such as touch screen functionality) to enter information indicating that the driver has dropped off the user. As yet another example, location information received from the user's device 102 can be analyzed to determine that the user's device 102 is at or near the new destination 122c. This determination can indicate that the driver has dropped off the user or is about to drop off the user.

The determination that the user has arrived at or near the new destination 122c can trigger the user's device 102 to display updated information. For example, the determination that the user has arrived at or near the new destination 122c can trigger the user's device 102 to display walking directions to the entrance of the new destination 122c from the drop off point (e.g., the user's current location). As another example, the determination that the user has arrived at or near the new destination 122c can trigger the user's device 102 to display street view images of the new destination 122c and/or the user's surrounding area to assist the user in visually identifying the new destination 122c (e.g., by looking for a building that resembles the street view image displayed on the user's device 102). As yet another example, the determination that the user has arrived at or near the new destination 122c can cause the user's device 102 to display an updated set of suggested locations of interest that are identified based on updated parameters. For example, the updated set of suggested locations of interest can be identified based on a geographic proximity from the user's current location identified as a reasonable walking distance (e.g., half a mile).

Other information can be used to identify updated information to display to the user upon the determination that the user has arrived at or near the new destination 122c. For example, the user's device 102 can access calendar information indicating that the user has planned to meet someone for dinner at 8:00 pm and can also identify that the current time is 7:40 pm. This determination along with the determination that the user has arrived at or near the new destination 122c can cause the user's device 102 to display suggested locations of interest near the user's current location where the user can spend time until 8:00 pm. As another example, the user's device 102 can determine that the current time is 4:40 pm and that the establishment at the new destination 122c (e.g., the Plush Lounge) doesn't open until 5:00 pm. This determination along with the determination that the user has arrived at or near the new destination 122c can trigger the user's device 102 to display suggested locations of interest for places near the user that are currently open and can provide services, products, or entertainment for the user until the new destination 122 is open. For example, the computing system that includes the user's device 102 can determine that the user has an interest in reading and cause the user's device 102 to present suggestions for bookstores within walking distance of the user's current location that are currently open.

Although the examples discussed with respect to FIGS. 1A-1F have been described with particular information displayed at the user's device 102 and other information displayed at the driver's device 152, in other implementations, some information described above as being displayed at the driver's device 152 can be displayed at the user's device 102 and vice versa. For example, information on the route 164 and/or the updated route 166 can be displayed on the user's device 102. This can allow the user to visually monitor progress along the displayed route. As another example, the locations of interest 122a-d can be displayed on the driver's device 152. This can allow the driver to orally provide suggested alternative destinations to the user when the user is located in the driver's vehicle.

In some implementations, the processes described above for providing suggested locations of interest to a user and for updating a travel route based on information received from a user at the user's computing device can be used for other forms of transportation other than ride sharing services. For example, the user of the user's device 102 can use the menu of routing options 116 shown in FIG. 1A to select driving directions to the desired destination 114. In this example, the example display information displayed on the display screens of the user's device 102 and the driver's device 152 as described above with respect to FIGS. 1A-1F can be displayed on a single computing device (e.g., on the driver's device 152). For example, a route to the desired destination 114 can be displayed on the user's device 102 and the suggested locations of interest 122a-d can be displayed at a point in time in the trip at which it is determined it is safe to display the suggested locations of interest 122a-d to the user, such as prior to the user beginning to drive his vehicle. As another example, the user may be a passenger in a car that is being driven by a friend and the locations of interest 122a-d can be displayed on the user's device 102 at any determined point in time along the trip.

Similarly, the user can use the menu of routing options 116 shown in FIG. 1A to select biking directions to the desired destination 114. The user's device 102 can display suggested locations of interest within different geographic proximities of the desired destination 114 and/or portions of the biking route as the user traverses the biking route. Display of the suggested locations of interest can be triggered based on the user's progress along the biking route.

In another implementation, the user can use the menu of routing options 116 shown in FIG. 1A to select public transportation directions to the desired destination 114. The user's device 102 can then display routing directions involving public transportation to the user. This can include, for example, walking directions to a first public transit stop, a name of a bus route or train line, a second public transit stop at which the user should exit the bus or train, and walking directions from the second public transit stop to the desired destination 114. In this example, the user's device 102 can display different sets of suggested locations of interest to the user based on a detected stage of the travel route.

For example, the user's device 102 can determine that the user is enroute to the first public transit stop (e.g., using location information collected by the user's device 102 to determine that the user is walking toward the first public transit stop). This can cause the user's device 102 to display a first set of suggested locations of interest. For example, the user's device 102 can display suggested locations of interest that are in a particular geographic proximity to the first public transit stop. These suggested locations of interest can be, for example, options for places where the user can pass time while waiting for a next train to arrive.

Upon the user entering the bus/train, the user's device 102 can display a second set of suggested locations of interest to the user. For example, a computing system that includes the user's device 102 can use bus/train tracking information to determine that the user's device 102 is moving along the same route and at the same pace as a bus/train. This determination can indicate that the user has boarded the bus/train and trigger display of the second set of suggested locations of interest to the user. As another example, pickup times for the first public transit stop can be used to identify a time to display the second set of suggested locations of interest.

In one example, the second set of suggested locations of interest can be a set of locations within a reasonable walking distance from the desired destination 114. As another example, the second set of locations of interest can be locations that are within a particular proximity of public transit stops that are along the current route. For example, if the current route to the desired destination 114 involves riding an elevated train past six stops, the second set of suggestions can be locations that are within three blocks of the six stops the user is predicted to pass on the way to the desired destination 114 while traversing the route. The suggested locations of interest displayed by the user's device 102 can be updated as the user traverses the route. For example, the suggested locations of interest can be for only geographic areas around the next two transit stops along the route. As the user passes public transit stops without exiting the train/bus, new suggested locations of interest are displayed for future public transit stops along the route.

The user's device 102 can then make a determination that the user has arrived at the second public transit stop. For example, location information collected at the user's device 102 can indicate that the user has arrived at the second transit stop. This can cause the user's device 102 to update the display to show a third set of suggested locations of interest. The third set of suggested locations of interest can be, for example, locations within reasonable walking distance of the user's current location, or locations within a relative proximity of the desired destination 114. As another example, the determination that the user has reached the second public transit stop can trigger the user's device 102 to display walking directions to the desired destination 114 or to display street view images of the desired destination 114 and/or the area around the user's current location.

In some implementations, the computing system that includes the user's device 102 can determine that the user has exited the bus/train at a stop other than the second public transit stop. For example, the computing system can compare location tracking information for the bus/train to location information for the user's device 102 to determine that the user's device 102 is no longer traveling on the bus/train. This determination can trigger the user's device 102 to display the third set of suggested locations of interest.

In some implementations, the user can select one of the suggested locations of interest as the user is traversing the original public transit based route to the desired destination 114. This can cause the user's device 102 to present an updated travel route to the selected location of interest. This can include updated public transit routing (e.g., suggestions for a different exit stop and/or other routes/lines to ride to reach the selected location of interest) as well as updated walking instructions for portions of the trip.

Figure 3A:
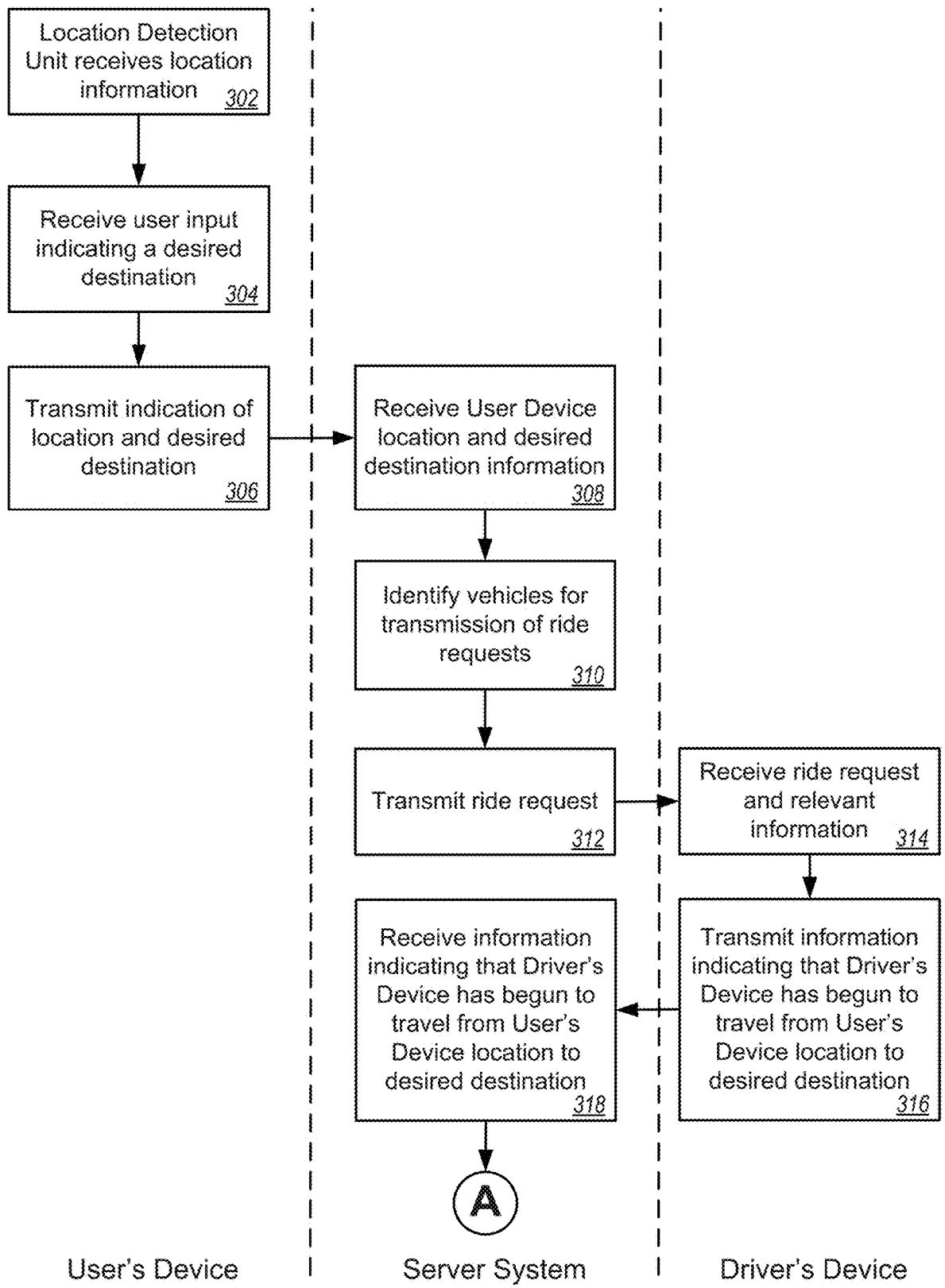
FIGS. 3A-3B show a flow diagram of actions taken in a navigation system.
Figure 3B:
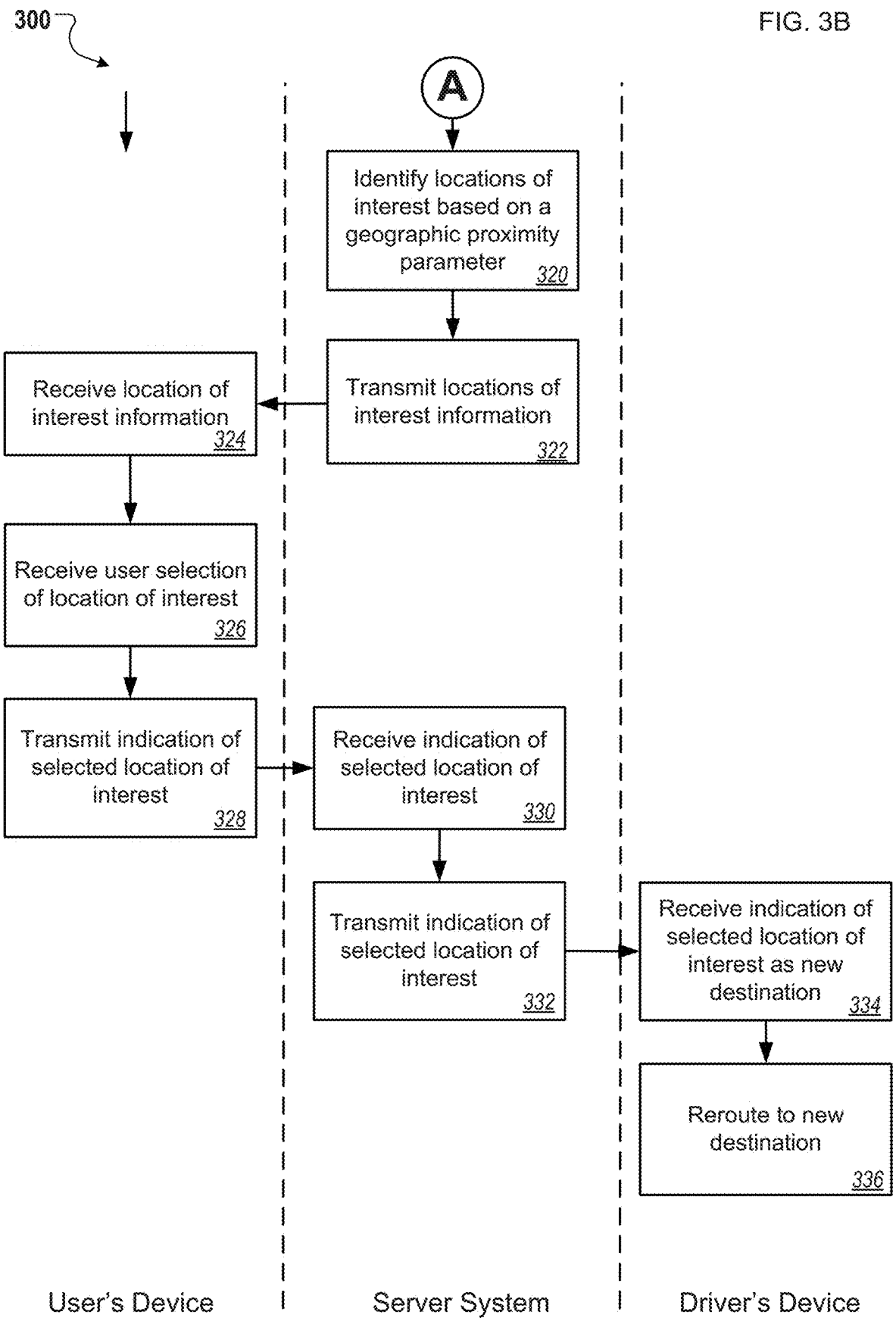

FIGS. 3A-3B show a flow diagram for a process 300 for providing suggested locations of interest to a user of a first computing device and rerouting a second computing device based on information received at the first computing device. The flow diagram shows various actions performed by a user's device, a server system, and a driver's device. The flow diagram also shows communications between the user's device, server system, and driver's device. In some implementations, the user's device, driver's device and/or the server system can be implemented as multiple computing devices. For example, the server system can be multiple servers in communication with each other and/or the user's and driver's devices performing various tasks. The user's device can be, for example, the user's device 102 depicted in FIGS. 1A, 1C, and 1E. The driver's device can be, for example, the driver's device 152 depicted in FIGS. 1B, 1D, and 1F.

Figure 2:
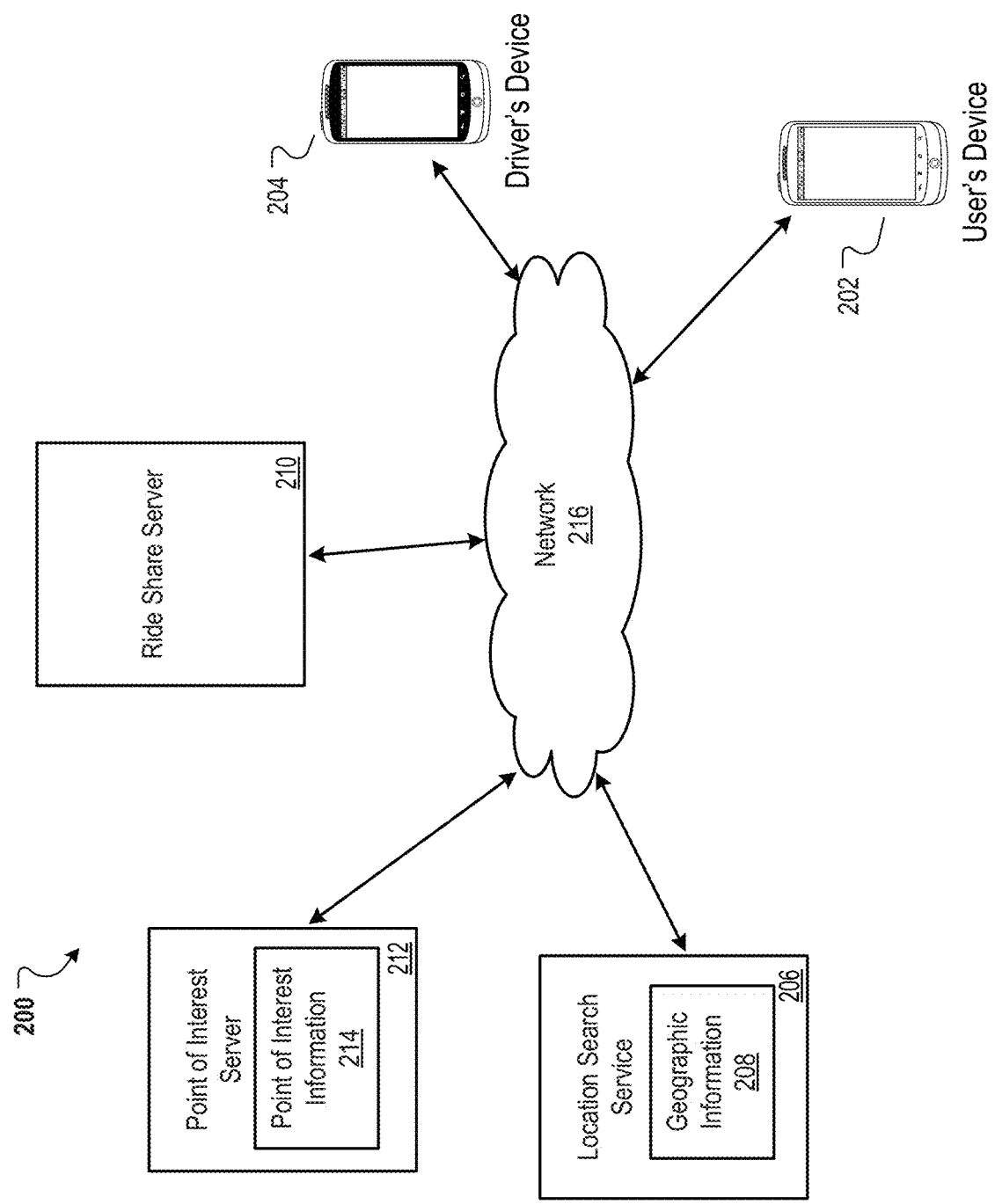
FIG. 2 is a schematic diagram of a system for rerouting in a navigation system based on updated information.

The process 300 can be, for example, performed by a system 200 as shown in FIG. 2. The system 200 includes a user's device 202, a driver's device 204, a location search service 206 having a store of geographic information 208, a rideshare server 210, and a point of interest server 212 having a store of point of interest information 214. The user's device 202, driver's device 204, location search service 206, rideshare server 210, and point of interest server 212 can communicate through a network 216, such as the Internet, a cellular communications network a WAN, a LAN, or a combination of communications networks. In some implementations, each of the location search service 206, rideshare server 210, and point of interest server 212 are implemented as multiple servers or other computing devices in communication with each other. In some implementations, the location search service 206 and the point of interest server 212 are part of the same computing system. In some implementations, the location search service 206, the point of interest server 212, and the rideshare server 210 are all part of the same computing system. In some implementations, the rideshare server 210 and point of interest server 212 are part of the same computing system but are separate from the location search service 206.

Returning to FIG. 3A, a location detection unit operating at the user's device receives location information (302). For example, the user's device 202 can include integrated GPS circuitry for receiving and processing GPS satellite signals. The GPS circuitry included in the user's device 202 can use the received GPS signals to determine the location of the user's device 202. In some implementations, the user's device can use other techniques to determine a location of the user's device, such as cell phone tower triangulation, identification of location of a wireless or wired communication network access point, dead reckoning, or other methods known in the art.

The user's device receives user input indicating a desired destination (304). For example, the user of the user's device 202 can use search functionality of a mapping application to search for a particular business establishment (e.g. "Taste of Greece") or a type of business establishment (e.g. "restaurants"). The user's device 202 can resolve the query (for example, by communicating with the location search service 206) to identify locations that match the entered query. For example, the user's device 202 can transmit the entered query to the location search service 206 through the network 216. The location search service 206 can identify locations that match the query. For example, the location search service 206 can access the store of geographic information 208 to identify restaurants located in an area near the user's device 202 or in an area indicated by the user. The location search service 206 can return one or more search results to the user's device 202 through the network 216 for presentation to the user's device 202. For example, a location of a restaurant identified in the user's query can be displayed on a map display of the user's device 202. As another example, the user's device 202 can resolve a query using cached information stored at the user's device 202. As yet another example, the user can enter an address or intersection as a desired destination. As yet another example, the user can "drag and drop" a pin on a map display to indicate a desired destination.

The user's device transmits an indication of the location of the user's device 202 and the desired destination to the server system (306). For example, the user's device 202 can transmit an address, latitude and longitude coordinates, or other identifying information for the current location of the user's device 202 to the rideshare server 210 (which, as described above can be part of the same computing system as the location search service 206 and/or the point of interest server 212). The user's device 202 also transmits an indication of the desired destination to the rideshare server 210 through the network 216 (e.g., an address or name of the desired destination). In other implementations, in place of or in addition to the current location of the user's device, the user's device can transmit a desired pickup location to the server system. For example, the user can enter an address or otherwise indicate a pickup location that differs from the current location of the user's device 202 and the pickup location is transmitted from the user device 202 to the rideshare server 210 rather than the current position of the user's device 202.

The server system receives the user device location and desired destination information (308). For example, the rideshare server 210 can receive communications from the user's device 202 indicating the location of the user's device 202 and the rideshare server 210 through the network 216.

The server system identifies vehicles for transmission of ride requests. For example, the rideshare server 210 can identify rideshare drivers that are actively working and currently located within a particular distance of the current location of the user's device 202 (or the pickup location indicated by the user). For example, the rideshare server 210 can identify all drivers who are open to receive new riders that are currently located within a mile and a half of the current location of the user's device 202. As another example, the rideshare server 210 can identify the five closest drivers to the user's device 202 who are open to receive new riders. The set of identified vehicles can include a vehicle of the driver who owns (or is in possession of) the driver's device 204.

The server system transmits the ride request to the driver's device (312). For example, the rideshare server 210 can transmit the ride request to computing devices of drivers of the vehicles identified at 310. This can include transmitting the ride request to the driver's device 204 through the network 216.

The driver's device receives the ride request and relevant information (314). The relevant information can include, for example, the location of the user's device 202 (or pickup location indicated by the user) and the desired destination. The information can also include information on a fare for the ride or a current fare multiplier for the ride. The information can be received, for example, by the driver's device 204. Some or all of the received information can be displayed on the driver's device to allow the driver to decide if she would like to accept the ride request. For example, the current location of the user's device 202 can be displayed on a map display of the driver's device 204. The driver can interact with user input functionality of the driver's device to view additional information associated with the ride request and/or to accept the ride request. Acceptance of the ride request can involve additional communication between the driver's device and the server system. For example, the driver can use a touch screen of the driver's device 204 to select a control to accept the ride request. This can cause the driver's device 204 to transmit a ride acceptance communication to the rideshare server 210. The rideshare server 210 can then transmit a confirmation to the driver's device 204. Receipt of the confirmation by the driver's device 204 can cause the driver's device 204 to display a ride acceptance confirmation to the driver.

The driver's device transmits information indicating that the driver's device has begun to travel from the user device's location to the desired destination (316). For example, after accepting the ride request, the driver navigates her vehicle to the location of the user's device 202 (or the pickup location identified by the user device) and picks up the user. The driver's device 204 can provide information to the rideshare server 210 indicating that the driver's device 204 has arrived at the pickup location and then begun to travel toward the desired destination. For example, location information collected at the driver's device 204 (e.g., GPS location information) can be used to determine different locations of the driver's device 204 over time and this change in location over time can be used to determine that the driver's device 204 has begun to travel from the user's location to the desired destination. As another example, location information collected from both the user's device 202 and driver's device 204 can be compared to determine that the user's device 202 is in relative geographic proximity to the driver's device 204 and traveling with the driver's device 204. As another example, the driver can use input functionality of the driver's device to indicate that the driver has picked up the user and is beginning the trip to the desired destination. This indication provided by the driver can be transmitted to the server system.

The server system receives the information indicating that the driver's device has begun to travel from the user device's location to the desired destination (318). For example, the rideshare server 210 can receive a series of communications indicating different locations for the driver's device 204 over time. The rideshare server 210 can use the received location information to determine that the driver has traveled to the user's location and begun to travel toward the desired destination. As another example, the point of interest server 212 can receive information indicating that the driver's device has begun to travel from the user device's location to the desired destination. For example, the rideshare server 210 can transmit the information indicating that the driver's device has begun to travel from the user device's location to the desired destination to the point of interest server 212 through the network 216. As yet another example, the rideshare server 210 can indicate to the user's device 202 that the rideshare trip has begun (e.g., in response to change in location of the driver's device 204, or input received at the driver's device 204). The user's device 202 can then communicate an indication that the driver's device has begun to travel to the desired destination to the point of interest server 212. This indication can also include a request for one or more suggested points of interest for presentation at the user's device 202.

Turning to FIG. 3B, the server system identifies locations of interest based on a geographic proximity parameter (320). The identification of locations of interest can be performed, for example, by the rideshare server 210. As another example, the identification of locations of interest is performed by the point of interest server 212 which can be part of the same computing system as the rideshare server 210, or part of a distinct computing system. The geographic proximity parameter can be, for example, a distance from the desired destination, a distance form any portion of the route, a distance from the current location of the user's device 202, or a distance from particular spots along the route to the desired destination. The distance for the geographic proximity parameter can be the same for all users, or can be based on factors such as past historic activity of the user, preference information for the user, or factors related to the general geographic area. For example, past user historic activity might indicate that the user is willing to travel up to 1.5 miles by foot. The distance for the geographic proximity parameter can be set to 1.5 miles based on this information. As another example, the distance for the geographic proximity parameter might be set at a greater value for a geographic region that is walking friendly over a geographic region that is not walking friendly. As another example, the distance for the geographic parameter can be set based on the user's progress along the trip to the desired destination (e.g., the further the user is from the desired destination, the greater the distance of the geographic proximity parameter).

The server system accesses information on physical locations to identify the locations of interest within the geographic area determined using the geographic proximity parameter. For example, the point of interest server 212 can access the store of point of interest information 214 to identify locations of interest that match user preferences of the user or relate to information associated with the desired destination. For example, if the desired destination is a restaurant and the time is currently mid-evening, the server system can identify dessert establishments near the restaurant as suggestions for dessert options after the user has eaten dinner.

In some implementations, businesses can pay to be promoted as suggested locations of interest. For example, particular restaurants can pay to be presented as suggested locations of interest when the user has identified a different restaurant within a specified distance as a desired destination. The point of interest server 212 can allow businesses to provide various factors that can be taken into account when determining if the business will pay to be promoted as a point of interest. For example, a particular bookstore can identify that it is willing to pay to be promoted as a location of interest when the user has entered a desired destination of another bookstore, a library, or a coffee shop within two miles of the particular bookstore. In some implementations, businesses can enter an auction for placement as suggested locations of interest. Bids in the placement auction could be weighted by other factors, such as proximity of a particular location to the original desired destination.

In some implementations, payment for placement as a suggested location of interest is partially or entirely dependent on selection of the suggested location of interest as a new destination by the user. For example, after a set of suggested locations of interest are presented on the user's device, the user can select one of the locations of interest as a new destination for the current trip. Upon selection by the user of the location of interest as the new destination, the business entity associated with the selected location of interest is charged for placement as a suggested location of interest. In some implementations, the business is charged a first fee upon being presented at the user's device as a suggested location of interest, and is charged a second fee if the particular location of interest is selected as a new destination by the user.

In some implementations, the server system automatically identifies the locations of interest without receiving an explicit request to identify the locations of interest. For example, the point of interest server 212 does not receive an express request from the user's device 202 requesting transmission of suggested locations of interest to the user's device 202, but rather performs search for locations of interest in response to receiving the information indicating the desired destination.

The server system transmits locations of interest information to the user's device (322). For example, the point of interest server 212 transmits indications of the locations of interest to the user's device 202 through the network 216. The locations of interest information can include, for example, location information for the locations of interest (e.g., addresses), names of the locations of interest, brief descriptions of the locations of interest, operating hours, reviews, menus, pictures, and other information. In some implementations, the locations of interest information includes information that can assist the user in deciding whether to select a particular location of interest as a new destination for the trip or to remain on the route to the originally indicated desired destination.

For example, the server system can provide ratings for the suggested locations of interest so that the ratings can be displayed along with a rating for the desired destination at the user's device to allow the user compare the ratings. A another example, the server system can provide reviews for the suggested locations of interest so that the reviews can be displayed along with reviews for the desired destination at the user's device to allow the user compare the reviews. A another example, the server system can provide menus for the suggested locations of interest so that the menus can be displayed along with menus for the desired destination at the user's device to allow the user compare the menus.

As another example, the locations of interest information can include information on the cost of traveling to the suggested locations of interest which can be displayed on the user's device along with the cost of the current trip to the original desired destination to allow the user to compare the costs and factor the cost difference into the decision making process for deciding to select one of the locations of interest as a new destination. The cost information can also include or factor in discounts provided by the businesses identified as potential locations of interest or by the rideshare service. For example, particular businesses may offer to pay for all or part of a rideshare trip to the businesses' physical locations. The discounted fare for traveling to a suggested location can be displayed on the user's device for comparison to the cost of the current trip to the original desired destination by the user. As another example, a business can offer to pay for the difference in cost of the rideshare trip if the fare for traveling to the business is greater than the cost of the original trip to the desired destination.

As another example, particular businesses can offer coupons or discounts for products or services available at the businesses that can be included as part of the locations of interest information. The coupons or discounts can be displayed to the user on the user's device. The user can view information on the coupon or discount and take this information into account when deciding whether to reroute to the business that provided the coupon or discount.

Transmission of the locations of interest information can be performed in response to a particular threshold occurrence being satisfied. For example, in some implementations, the locations of interest information in transmitted in response to the server system receiving the information indicating that the driver's device has begun to travel from the user device's location to the desired destination at 318. In some implementations, the locations of interest information is transmitted once the current trip has reached a particular stage (e.g., the user has been picked up, the driver has departed toward the user, the driver has departed toward the desired destination, or the driver has passed a certain trigger point along the route).

The user's device receives location of interest information (324). For example, the user's device 202 can receive information on locations of interest identified by the point of interest server 212 via communications transmitted through the network 216. The user's device can then present some or all of the information to the user. For example, the user's device can display the locations of interest on a map display. The user can then select one or more of the locations of interest on the map display to view additional information about the locations of interest (such as reviews, ratings, menus, description, cost of transportation to the location of interest, discounts, or coupons.).

The user's device receives a user selection of a location of interest (326). For example, the user can select a particular location of interest displayed on the user's device 202 as a new destination for the current trip using a graphic user interface such as that shown on the user's device 102 in FIG. 1E. The selection can be made using touchscreen functionality of the user's device, one or more input keys of the user's device, or other input mechanisms for the user's device.

The user's device transmits an indication of the selected location of interest (328). For example, the user's device 202 can transmit an indication of the selected location of interest as a new destination for the current trip to the rideshare server 210 through the network 216. The indication of the selected location of interest can include an address for the selected location of interest, other geographic indicators (e.g., latitude and longitude) for the selected location of interest, a name of the selected location of interest, or an identifier for the selected location of interest.

The server system receives the indication of the selected location of interest (330). For example, the rideshare server 210 can receive a communication from the user's device 202 indicating that the user wishes to reroute the current trip to the selected location of interest. This can cause the rideshare server 210 to generate a communication for transmission to the driver's device 204 indicating an updated route for the current trip. In some implementations, the server system translates the information received from the user's device to another form of location information. For example, the server system may receive a location ID for the selected location of interest and can use a look-up table to translate the location ID to a street address for the selected location of interest.

The server system transmits an indication of the selected location of interest (332). For example, the rideshare server 210 can transmit an address for the selected location of interest to the driver's device 204 and indicate that the address should be used as a new destination for the current trip. In some implementations, the communication to the driver's device can include routing information for a route from the driver's current location (or from another location, such as the original pickup location) to the selected location of interest.

The driver's device receives the indication of the selected location of interest as the new destination (334). For example, the driver's device 204 receives the address of the selected location of interest from the rideshare server 210 along with information that the address is to be used as the new destination for the current trip.

The driver's device reroutes to the new destination (336). For example, the driver's device 204 can calculate a route from the present location of the driver's device 204 to the selected location of interest and display the updated route on the display screen of the driver's device 204. The user's device 202 can also display a notice indicating that the route has been updated to travel to the new destination (the selected location of interest). In some implementations, the user's device 202 issues an audio alert indicating that the route is being updated to a new destination.

In some implementations, various portions of the process 300 can be performed in a different order than that shown. For example, the server system can identify locations of interest prior to receiving the information indicating that the driver's device has begun to travel from the user device's location to the desired destination. In some implementations, portions of the process 300 indicated as being performed by a particular device or system (e.g., the user's device, the server system, or the driver's device) can be performed by a different device or system. For example, the user's device can identify locations of interest using cached information stored at the user's device or by communicating with remote computers storing information on potential locations of interest.

Figure 4:
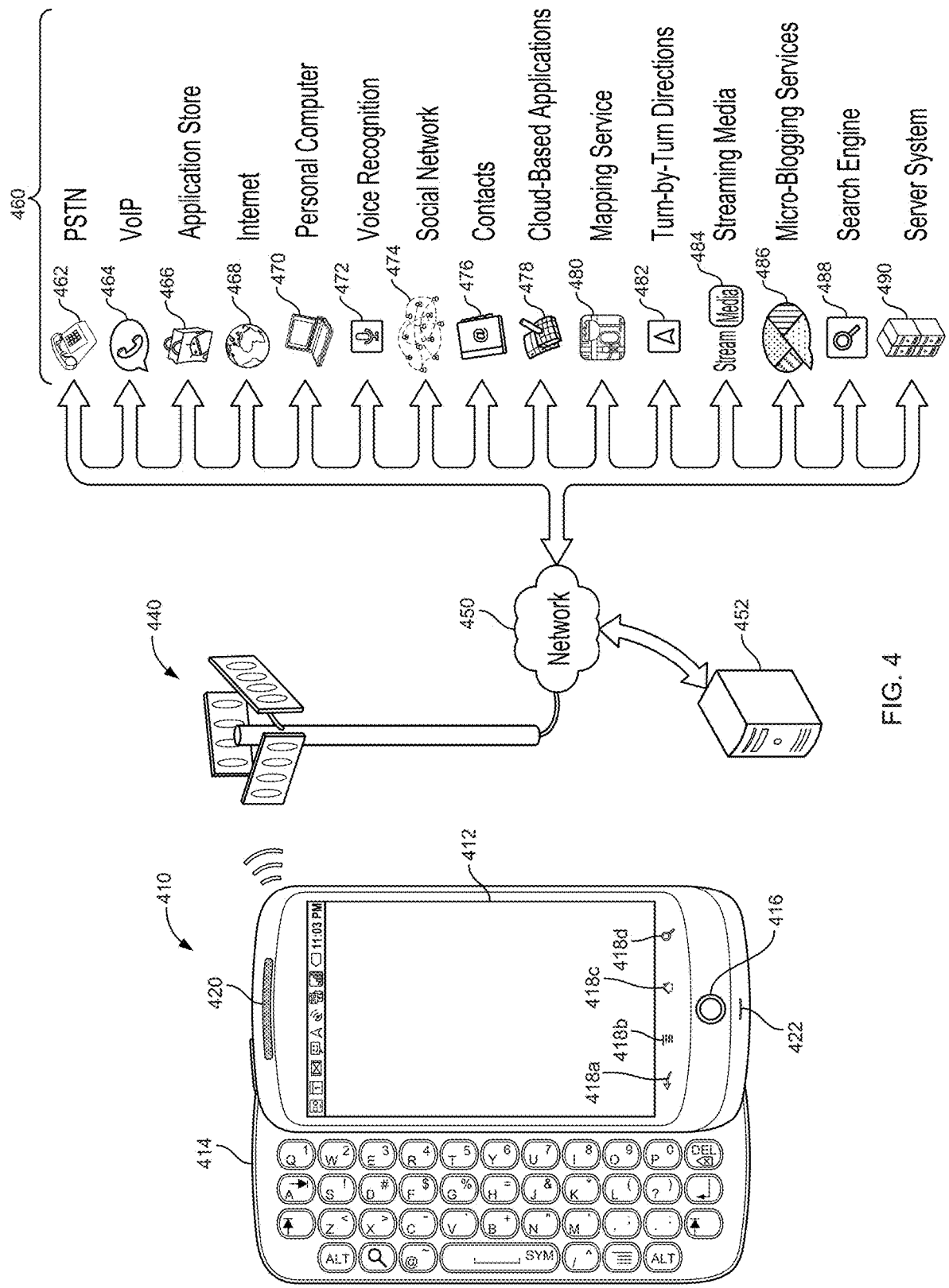
FIG. 4 is a conceptual diagram of a system that may be used to implement the systems and methods described in this document.

Referring now to FIG. 4, a conceptual diagram of a system that may be used to implement the systems and methods described in this document is illustrated. In the system, mobile computing device 410 can wirelessly communicate with base station 440, which can provide the mobile computing device wireless access to numerous hosted services 460 through a network 450.

In this illustration, the mobile computing device 410 is depicted as a handheld mobile telephone (e.g., a smartphone, or an application telephone) that includes a touchscreen display device 412 for presenting content to a user of the mobile computing device 410 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 414, physical buttons, trackballs, accelerometers, gyroscopes, and magnetometers).

Example visual output mechanism in the form of display device 412 may take the form of a display with resistive or capacitive touch capabilities. The display device may be for displaying video, graphics, images, and text, and for coordinating user touch input locations with the location of displayed information so that the device 410 can associate user contact at a location of a displayed item with the item. The mobile computing device 410 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 414, which may be a full qwerty keyboard or a traditional keypad that includes keys for the digits '0-9', '*', and '#.' The keyboard 414 receives input when a user physically contacts or depresses a keyboard key. User manipulation of a trackball 416 or interaction with a track pad enables the user to supply directional and rate of movement information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418*a-d*. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" graphical user interface that is displayed after turning on the mobile computing device 410, after activating the mobile computing device 410 from a sleep state, after "unlocking" the mobile computing device 410, or after receiving user-selection of the "home" button 418*c*. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 410 operations. For example, a single-action user input (e.g., a single tap of the touchscreen, swipe across the touchscreen, contact with a button, or combination of these occurring at a same time) may invoke an operation that changes a display of the user interface.

Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 410 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 410. The mobile device 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., ETHERNET, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computing systems that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing systems associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call using a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 5:
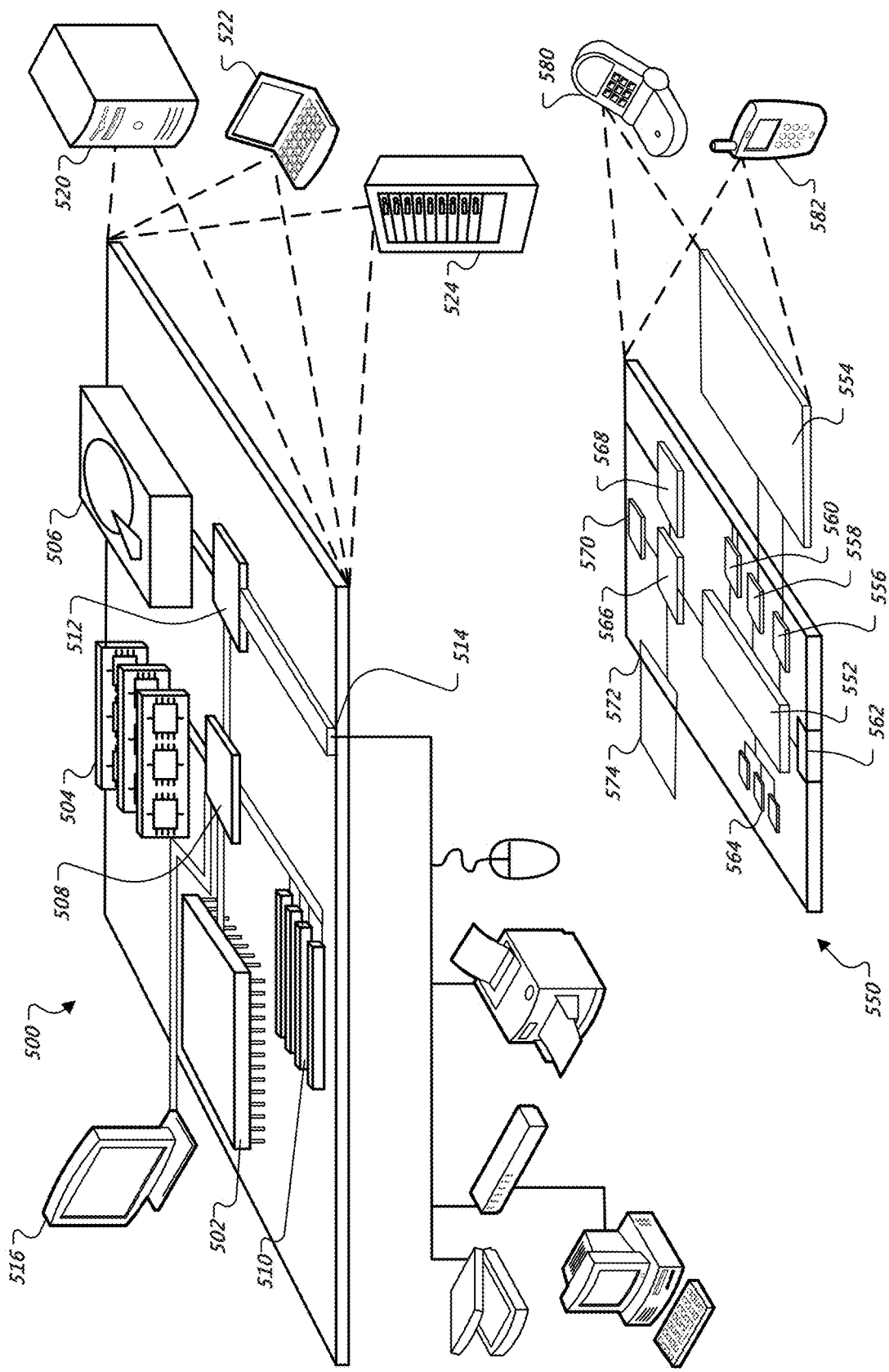
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provided, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
transmitting, from a first mobile computing device that is used by a ride share passenger and to a ride share server, first pickup location information indicating first pickup location and information indicative of an initial desired destination location;
in response to an indication by a second mobile computing device that is used by a ride share driver that the ride share driver has picked up the ride share passenger, providing, for output on the first mobile computing device that is used by the ride share passenger, a user interface that identifies a selectable, updated desired destination location that (i) is different than the initial desired destination location, (ii) is of a same type as the initial desired destination location, and (iii) has been selected as a result of a suggested location placement auction; and
in response to determining that the ride share passenger has selected the updated desired destination location, (i) transmitting, by the first mobile computing device that is used by the ride share passenger and to the ride share server, a rerouting request instructing the ride share server to replace, on the second mobile computing device that is used by the ride share driver, an initial route from the pickup location to the initial desired destination location with an updated route from a current location of the second mobile computing device to the updated desired destination location, and (ii)

generating a charge associated with providing the option to the updated desired destination location or with determining that the ride share passenger has selected the updated desired destination location.

2. The method of claim 1, further comprising identifying one or more locations of interest by the ride share server without the first mobile computing device that is used by the ride share passenger transmitting an explicit request to the ride share server to identify the one or more locations of interest.

3. The method of claim 1, wherein the first pickup location information indicating the first pickup location and the information indicative of the initial desired destination location are transmitted to the ride share server by the first mobile computing device that is used by the ride share passenger as part of a ride share request that is generated by a ride share application that is executing on the first mobile computing device.

4. The method of claim 1, wherein the ride share server transmits the first pickup location information indicating the first pickup location and the information indicative of the initial desired destination location to the second mobile computing device that is used by the ride share driver as part of a ride share request before the first mobile computing device that is used by the ride share passenger transmits the information indicating the updated desired destination location to the ride share server.

5. The method of claim 1, wherein the ride share server transmits the rerouting request to the second mobile computing device that is used by the ride share driver for visual presentation to the driver by way of a ride share application that is executing on the second mobile computing device.

6. The method of claim 1, wherein the ride share server determines a geographic proximity range at least in part based on a distance from the first mobile computing device that is used by the ride share passenger to the initial desired destination location.

7. The method of claim 1, wherein receiving, at the first mobile computing device, the first pickup location information indicating the first pickup location comprises receiving user input indicating the first pickup location.

8. A system comprising:
one or more processing devices;
one or more non-transitory machine-readable storage devices for storing instructions that are executable by the one or more processing devices to perform operations comprising:
transmitting, from a first mobile computing device that is used by a ride share passenger and to a ride share server, first pickup location information indicating first pickup location and information indicative of an initial desired destination location;
in response to an indication by a second mobile computing device that is used by a ride share driver that the ride share driver has picked up the ride share passenger, providing, for output on the first mobile computing device that is used by the ride share passenger, a user interface that identifies a selectable, updated desired destination location that (i) is different than the initial desired destination location, (ii) is of a same type as the initial desired destination location, and (iii) has been selected as a result of a suggested location placement auction; and
in response to determining that the ride share passenger has selected the updated desired destination location, (i) transmitting, by the first mobile computing device that is used by the ride share passenger and to the ride share server, a rerouting request instructing the ride share server to replace, on the second mobile computing device that is used by the ride share driver, an initial route from the pickup location to the initial desired destination location with an updated route from a current location of the second mobile computing device to the updated desired destination location, and (ii) generating a charge associated with providing the option to the updated desired destination location or with determining that the ride share passenger has selected the updated desired destination location.

9. The system of claim 8, wherein the operations further comprise identifying one or more locations of interest by the ride share server without the first mobile computing device that is used by the ride share passenger transmitting an explicit request to the ride share server to identify the one or more locations of interest.

10. The system of claim 8, wherein the first pickup location information indicating the first pickup location and the information indicative of the initial desired destination location are transmitted to the ride share server by the first mobile computing device that is used by the ride share passenger as part of a ride share request that is generated by a ride share application that is executing on the first mobile computing device.

11. The system of claim 8, wherein the ride share server transmits the first pickup location information indicating the first pickup location and the information indicative of the initial desired destination location to the second mobile computing device that is used by the ride share driver as part of a ride share request before the first mobile computing device that is used by the ride share passenger transmits the information indicating the updated desired destination location to the ride share server.

12. The system of claim 8, wherein the ride share server transmits the rerouting request to the second mobile computing device that is used by the ride share driver for visual presentation to the driver by way of a ride share application that is executing on the second mobile computing device.

13. The system of claim 8, wherein the ride share server determines a geographic proximity range at least in part based on a distance from the first mobile computing device that is used by the ride share passenger to the initial desired destination location.

14. The system of claim 8, wherein receiving, at the first mobile computing device, the first pickup location information indicating the first pickup location comprises receiving user input indicating the first pickup location.

15. A non-transitory machine-readable storage device for storing instructions that are executable by one or more processing devices to perform operations comprising:
transmitting, from a first mobile computing device that is used by a ride share passenger and to a ride share server, first pickup location information indicating first pickup location and information indicative of an initial desired destination location;
in response to an indication by a second mobile computing device that is used by a ride share driver that the ride share driver has picked up the ride share passenger, providing, for output on the first mobile computing device that is used by the ride share passenger, a user interface that identifies a selectable, updated desired destination location that (i) is different than the initial desired destination location, (ii) is of a same type as the initial desired destination location, and (iii) has been selected as a result of a suggested location placement auction; and in response to determining that the ride share passenger has selected the updated desired destination location, (i) transmitting, by the first mobile computing device that is used by the ride share passenger and to the ride share server, a rerouting request instructing the ride share server to replace, on the second mobile computing device that is used by the ride share driver, an initial route from the pickup location to the initial desired destination location with an updated route from a current location of the second mobile computing device to the updated desired destination location, and (ii) generating a charge associated with providing the option to the updated desired destination location or with determining that the ride share passenger has selected the updated desired destination location.

16. The device of claim 15, further comprising identifying one or more locations of interest by the ride share server without the first mobile computing device that is used by the ride share passenger transmitting an explicit request to the ride share server to identify the one or more locations of interest.

17. The device of claim 15, wherein the first pickup location information indicating the first pickup location and the information indicative of the initial desired destination location are transmitted to the ride share server by the first mobile computing device that is used by the ride share passenger as part of a ride share request that is generated by a ride share application that is executing on the first mobile computing device.

18. The device of claim 15, wherein the ride share server transmits the first pickup location information indicating the first pickup location and the information indicative of the initial desired destination location to the second mobile computing device that is used by the ride share driver as part of a ride share request before the first mobile computing device that is used by the ride share passenger transmits the information indicating the updated desired destination location to the ride share server.

19. The device of claim 15, wherein the ride share server transmits the rerouting request to the second mobile computing device that is used by the ride share driver for visual presentation to the driver by way of a ride share application that is executing on the second mobile computing device.

20. The device of claim 15, wherein the ride share server determines a geographic proximity range at least in part based on a distance from the first mobile computing device that is used by the ride share passenger to the initial desired destination location.

* * * * *